3,793,440
REACTION OF HYDROGEN SULPHIDE AND SULPHUR DIOXIDE TO FORM ELEMENTARY SULPHUR

Gerhard Schulze, Ludwigshafen, Germany, assignor to Badische Anilin- & Soda-Fabrik Aktiengesellschaft, Ludwigshafen (Rhine), Germany
No Drawing. Filed Feb. 17, 1972, Ser. No. 227,232
Claims priority, application Germany, Feb. 20, 1971, P 21 08 284.8
Int. Cl. C01b 17/04
U.S. Cl. 423—573         3 Claims

ABSTRACT OF THE DISCLOSURE

Hydrogen sulfide is reacted with sulfur dioxide or oxygen to form sulfur in the presence of certain solvents. These solvents are sulfoxides of the general formula:

$$R^1\text{—SO—}R^2$$

or inert polar aprotic solvents containing dissolved therein phosphine oxides of the general formula: $(R^2)_3P=O$.

---

Various methods are known for removing hydrogen sulfide from gases while at the same time recovering sulfur. In the method known as the absorption method the hydrogen sulfide is removed from the gas to be purified by washing with a suitable absorbent, and after desorption is oxidized to sulfur for example by the Claus method. Since this method does not proceed to completion, the offgas obtained still contains fairly large quantities of hydrogen sulfide and sulfur dioxide.

In the methods known as the oxidation methods the hydrogen sulfide is absorbed in a wash liquid and oxidized therein direct with air or with sulfur dioxide (without previous separation) to form sulfur. This method may be carried out in two stages or in one stage. In the two stage method the hydrogen sulfide is first enriched in the reaction medium by absorption and then the oxidizing agent is mixed with the gas to be purified prior to washing and oxidation proceeds together with the absorption in one zone. Known solvents are water, aqueous salt solutions, monohydric and polyhydric alcohols, phenols, amines and acid amides, as for example N-methylpyrrolidone, and also tetrasubstituted ureas. If necessary, oxidizing agents such as ferric salts, salts of arsenic or salts of naphthoquinone or anthraquinone disulfonic acids have to be added to the solvents serving as absorbents. These known solvents however have various disadvantages; thus the poor degree of reaction in some cases limits the method to gases having very low contents of hydrogen sulfide, which in turn necessitates large washing towers. Moreover owing to secondary reactions there is formed in some solvents highly contaminated sulfur which cannot be purified simply by washing with water so that additional extractions are necessary. The poor separability of the sulfur usually formed in very finely divided conditions constitutes a further problem. Volatility or decomposability of the solvent or of the catalyst occasions loss with consequent additional cost and in the case of volatility results in undesirable air pollution. Finally reference has to be made to the toxicity of solutions containing arsenic when these are used. Furthermore it is sometimes necessary to carry out previous separation of carbon dioxide in the processing of gas mixtures which contain carbon dioxide.

The present invention has for its object to provide a process for the reaction of hydrogen sulfide with sulfur dioxide or with oxygen or gas containing oxygen to form elementary sulfur according to the equation:

$$2H_2S+SO_2\rightarrow 3S+2H_2O$$

in the presence of a solvent, in which process the above-mentioned disadvantages do not occur and in which in particular the sulfur is obtained in practically pure form, and which also permits gas mixtures containing carbon dioxide to be processed without the need for carbon dioxide to be separated in a special operation.

I have found that this object is achieved by carrying out the reaction in the presence of:

(a) a sulfoxide of the general formula: $R^1\text{—SO—}R^2$ in which $R^1$ and $R^2$ are identical or different alkyl or oxyalkyl groups or one to four carbon atoms or in which $R^1$ and $R^2$ are methylene groups which are common members of a three-membered to six-membered cyclic sulfoxide, and/or (b) a polar aprotic solvent containing dissolved therein a phosphine oxide of the general formula: $(R^3)_3P=O$ in which $R^3$ are identical or different alkyl groups of up to three carbon atoms and/or phenyl groups.

Examples of suitable sulfoxides are dimethylsulfoxide, diethylsulfoxide, di-n-propylsulfoxide, ethylethoxysulfoxide, methylethoxysulfoxide, diethoxysulfoxide, tetramethylenesulfoxide and 1,4-oxathiansulfoxide.

Examples of suitable phosphine oxides are trimethylphosphine oxide, triethylphosphine oxide and triphenylphosphine oxide.

The sulfoxides may be used as such when they are liquids or compounds having melting points below the desired operating temperature. They may however also be mixed with a solvent or used dissolved in such a solvent. In particular, sulfoxides which are solid at room temperature are used in dissolved form. Sulfoxides having melting points which are higher than the operating temperature chosen are invariably used dissolved in a solvent. This also holds good for phosphine oxides.

Suitable solvents are all polar aprotic solvents which are inert, i.e. which do not react with hydrogen sulfide or sulfur dioxide or oxygen or form salt-like compounds like certain amines and in which hydrogen sulfide will not react with sulfur dioxide or oxygen.

Aprotic, polar and inert solvents which in addition to a high boiling point, for example more than 150° C., particularly more than 190° C., have a dielectric constant of at least 20, particularly at least 40 (measured at 25° C.) are particularly suitable. The solvent should have a good dissolving power for hydrogen sulfide and sulfur dioxide and accordingly should be characterized by a Bunsen absorption coefficient α (ml. of gas/ml. of solvent at 0° C. and 760 mm.) which amounts to at least 95 for $H_2S$ and at least 30 for sulfur dioxide. Examples of such solvents are polyalcohols, for example ethyleneglycol or glycerol, nitriles, for examples benzonitrile, and particularly ethylene carbonate, propylene carbonate and tetramethylenesulfone. The concentration of the sulfoxide in the said solvents may be as high as desired but it has proved to be convenient to use solutions containing at least 5% and preferably at least 10% by weight of sulfoxide.

In addition to the said aprotic solvents, limited amounts of water may be added. In order to avoid undesired secondary reactions between hydrogen sulfide and sulfur dioxide as fast as possible, and to obtain the sulfur formed in the best possible crystallized form, it is recommended that the water content of the mixture should be limited to about 30% by weight.

The process of the invention is suitable for the complete desulfurization of gases or gas mixtures whose hydrogen sulfide content may vary widely. Thus gas mixtures which for example contain only 0.0001% by volume of hydrogen sulfide may be completely desulfurized in the same way as gases having 5% by volume or more of hydrogen sulfide. The process may be used particularly advantageously for gases which in addition to hydrogen sulfide contain already the stoichiometric amount of sulfur dioxide, as for example the offgas from a Claus furnace. Gases having other ratios of $H_2S:SO_2$ may be adjusted to the necessary stoichiometric ratio in the conventional way by adding sulfur dioxide or hydrogen sulfide.

The process according to the invention may be carried out industrially in various ways. Thus for example the gas to be purified may be passed through a packed absorption tower countercurrent to recycle solvent. The sulfur formef during the reaction and entrained by the solvent is then separated by a conventional method. The gas to be treated may however be introduced in finely divided form into the solvent, for example in a bubble column, and allowed to bubble through the reaction medium. Here again the solvent is periodically freed from deposited sulfur.

Another method which is particularly suitable for gas having a very small content of hydrogen sulfide, consists in impregnating a carrier material having a large surface area such as pumice, activated carbon or diatomaceous earth, with the said sulfoxides or solutions thereof and passing the gas to be purified over the same.

The process of the invention may be carried out at atmospheric or superatmospheric pressure and at room temperature or elevated temperature. Generally however it is carried out at atmospheric pressure in a range of temperatures of from 15° C. to 130° C., preferably of from 60° C. to 100° C. In order to keep the water content of the solvent constant it is convenient to use a temperature at which both the water vapor introduced with the gas to be purified and the water of reaction formed are removed from the reaction mixture.

When the process is carried out at a temperature lower than the melting point of sulfur, the sulfur formed is precipitated in crystalline form and can easily be separated from the mother liquor by filtration, centrifuging, decantation or the like. The amounts of adherent solvent, usually small, may be removed in a simple way by washing with water. The sulfur purified in this way reaches purities of more than 99.8%. The sulfur suspension formed may however first be heated inside or outside the reaction vessel to a temperature above the melting point of sulfur and the molten sulfur then withdrawn in known manner from the solvent as the second liquid phase. It is also possible however to carry out the reaction of hydrogen sulfide with sulfur dioxide from the start at a temperature of more than 120° C. and to withdrawn the liquid sulfur formed direct from the reactor. Another advantage of the process of the invention is that it is possible to process gas containing carbon dioxide immediately without it being necessary first to remove the carbon dioxide from the gas to be purified in a separate operation.

The process may be carried out batchwise or continuously.

The following examples illustrate the invention.

EXAMPLE 1

500 ml. of dimethylsulfoxide is placed in a bubble column having a diameter of 3 cm. and 70 liters per hour of a gas mixture containing 99 by volume of nitrogen, 0.66% by volume of hydrogen sulfide and 0.33% by volume of sulfur dioxide is introduced at 70° C. through a fitted glass disk. Neither hydrogen sulfide nor sulfur dioxide can be detected in the offgas leaving the bubble column. After about seven hours the precipitated sulfur is filtered off, washed with water and dried. The sulfur obtained in this way is fine crystals and has a purity of 99.9%.

EXAMPLE 2

100 liters per hour of the gas mixture specified in Example 1 is passed per hour at 80° C. into a packed absorption tower having a length of 2 meters and a diameter of 30 mm. A solution of 10% by weight of ethylethoxysulfoxide in tetramethylenesulfone is circulated through the tower by a pump at the rate of 20 liters per hour. Hydrogen sulfide and sulfur dioxide are practically completely absorbed and converted quantitatively into sulfur.

The same result is achieved when a solution of 10% by weight 1,4-oxathiansulfoxide in sulfolane is used in the above equipment.

EXAMPLE 3

80 liters per hour of a gas mixture which contains 97% by volume of nitrogen, 2% by volume of hydrogen sulfide and 1% by volume of sulfur dioxide is passed at 80° C. through the absorption tower described in Example 2. At the same time 25 liters per hour of a solution of 10% by weight of tetramethylenesulfoxide in ethylene carbonate is circulated through the tower by a pump. The sulfur formed is filtered off outside the tower and the solvent then returned to the tower. Hydrogen sulfide and sulfur dioxide are absorbed practically completely and converted to sulfur.

EXAMPLE 4

70 liters per hour of a gas mixture containing 97% by volume of nitrogen, 2% by volume of hydrogen sulfide and 1% by volume of sulfur dioxide is passed through a fritted glass disk into a bubble column having a diameter of 25 mm. and a height of 1500 mm. which contains 500 ml. of a solution of 15% by weight of trimethylphosphine oxide in tetramethylenesulfone. The temperature of the phosphine oxide solution is kept at 70° C. during the experiment. Hydrogen sulfide and sulfur dioxide are practically undetectable in the offgas leaving the bubble column. Sulfur begins to precipitate after about forty-five minutes. After four hours the sulfur is filtered off, washed with water and dried. The sulfur obtained in this way is in the form of fine crystals and has a purity of 99.8%. The phosphine oxide solution may be used again.

An solution of 22% by weight of triethylphosphine oxide in propylene carbonate may be used with the same result under the same experimental conditions instead of the said trimethylphosphine oxide solution.

EXAMPLE 5

100 liters per hour of a gas mixture containing 99 parts by volume of nitrogen, 0.66 part by volume of hydrogen sulfide and 0.33 part by volume of sulfur dioxide is introduced at 80° C. into a packed absorption tower having a length of 2 meters and a diameter of 30 mm. At the same time a solution of 10% by weight of triphenylphosphine oxide in tetramethylenesulfone is circulated in the tower at the rate of 25 liters per hour. Hydrogen sulfide and sulfur dioxide are practically completely absorbed and converted into sulfur.

I claim:
1. A process for reacting hydrogen sulfide with sulfur dioxide or oxygen to form sulfur in the presence of a solvent wherein the reaction is carried out in the presence of a polar aprotic solvent containing dissolved therein a phosphine oxide of the general formula:

$$(R^3)_3P=O$$

in which $R^3$ are identical or different alkyls of up to three carbon atoms or phenyl groups.

2. A process as set forth in claim 1 wherein the solvent has a dielectric constant of at least 20 and a boiling point of at least 150° C.

3. A process as set forth in claim 1 wherein the reaction is carried out at atmospheric pressure and at a tempearture of from 15° to 130° C.

References Cited

UNITED STATES PATENTS 3,441,379    4/1969    Renault ............ 423—575
3,725,537    4/1973    Schulze et al. ....... 423—575

OTHER REFERENCES

Albertson et al.; Journal of the American Chemical Society; 1943; pp. 1690–91.

GEORGE O. PETERS, Primary Examiner

U.S. Cl. X.R.

423—575

UNITED STATES PATENT OFFICE
CERTIFICATE OF CORRECTION

Patent No. 3,793,440  Dated February 19, 1974

Inventor(s) Gerhard Schulze

It is certified that error appears in the above-identified patent and that said Letters Patent are hereby corrected as shown below:

Column 1, line 22, "$(R^2)_3P=O$" should read -- $(R^3)_3P=O$ --.

Column 2, line 1, insert -- with gas containing sulfur dioxide or -- before "with".

Column 2, line 55, "examples" should read -- example --.

Column 3, line 19, "formef" should read -- formed --.

Column 4, line 46, "An" should read -- A --.

Column 5, line 2-3, "tempearture" should read -- temperature --.

Signed and sealed this 15th day of October 1974.

(SEAL)
Attest:

McCOY M. GIBSON JR.
Attesting Officer

C. MARSHALL DANN
Commissioner of Patents